No. 635,383. Patented Oct. 24, 1899.
J. D. Q. HAMILTON.
TRAP FOR WATER PIPES.
(Application filed Aug. 31, 1898.)
(No Model.)
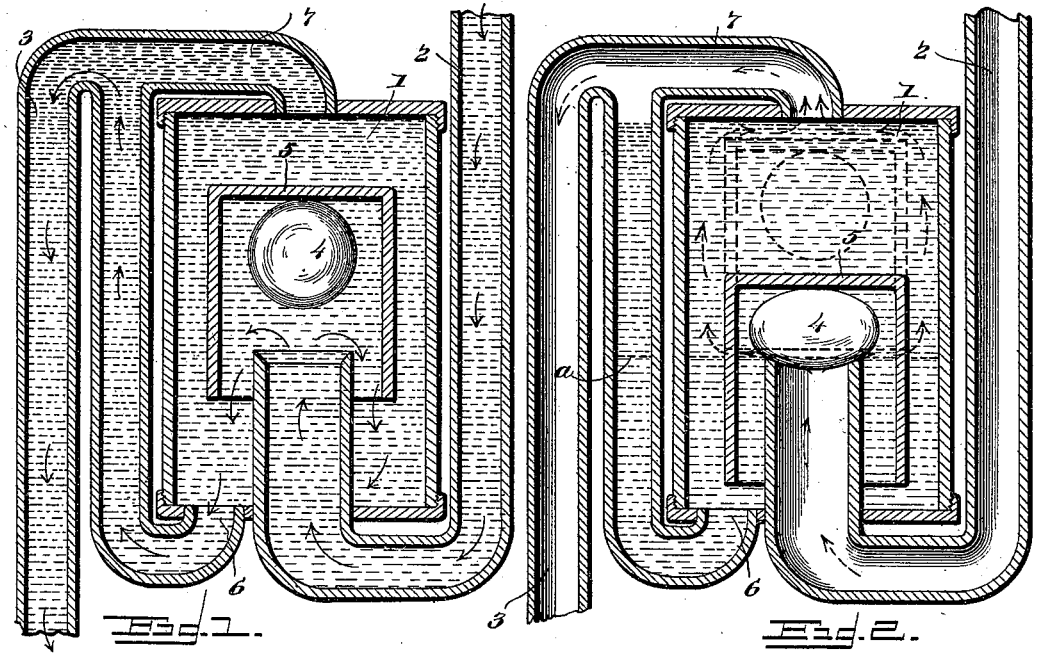
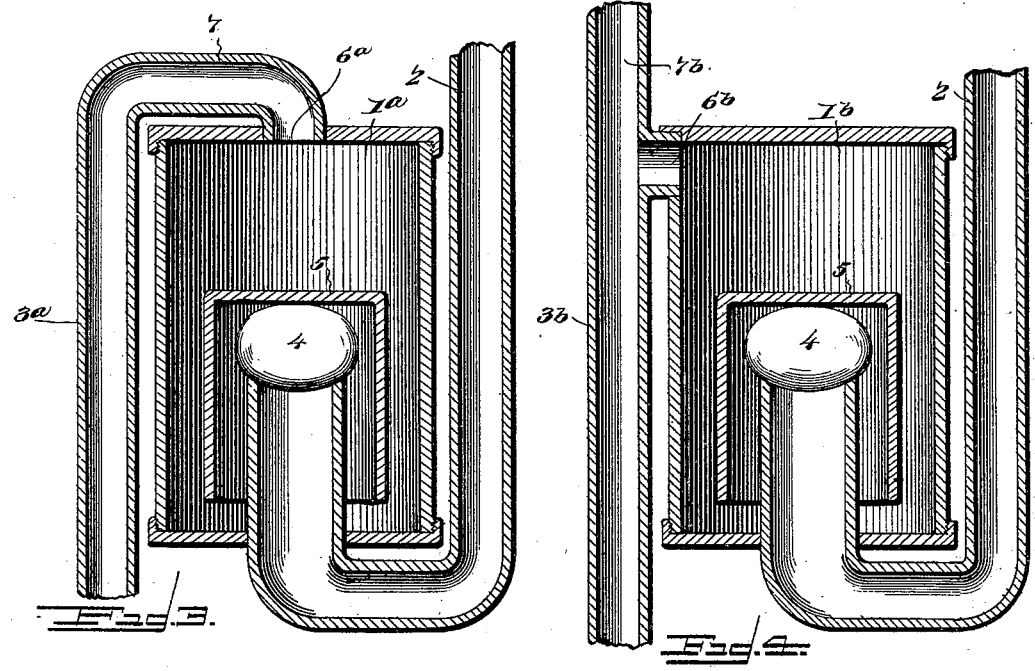
Witnesses
John D. Q. Hamilton, Inventor
By his Attorneys,
C. A. Snow & Co.

UNITED STATES PATENT OFFICE.

JOHN D. Q. HAMILTON, OF LEXINGTON, KENTUCKY.

TRAP FOR WATER-PIPES.

SPECIFICATION forming part of Letters Patent No. 635,383, dated October 24, 1899.

Application filed August 31, 1898. Serial No. 689,945. (No model.)

*To all whom it may concern:*

Be it known that I, JOHN D. Q. HAMILTON, a citizen of the United States, residing at Lexington, in the county of Fayette and State of Kentucky, have invented a new and useful Trap for Water-Pipes, of which the following is a specification.

My invention relates to seal-traps, and particularly to a combined seal-trap and air inlet or vent, and has for its object to provide a simple, compact, and efficient construction and arrangement of parts whereby the complete siphoning of the contents of the trap by reason of suction produced in the soil or sewer pipe is prevented, the air necessary to supply a partial vacuum produced by such suction being derived through the trap by the elevation, under the influence of said suction, of the means provided for closing the trap.

Further objects and advantages of this invention will appear in the following description, and the novel features thereof will be particularly pointed out in the appended claims.

In the drawings, Figure 1 is a sectional view of a trap constructed in accordance with my invention, the parts being shown in the positions which they occupy during the continuous flow of water through the trap. Fig. 2 is a similar view showing the valve and safety-cup seat and indicating different levels of the contents of the chamber before and after suction is produced in the sewer-pipe and also indicating in dotted lines the raised position of the cup and ball in order to admit air to prevent the complete siphoning of the liquid contents of the trap. Fig. 3 is a similar view showing a slightly-modified arrangement of the eduction-pipe. Fig. 4 is a similar view of still another modification.

Similar numerals of reference indicate corresponding parts in all the figures of the drawings.

The trap embodying my invention consists, essentially, of a chamber 1, with which communicate an induction-pipe 2 and an eduction-pipe 3, a ball-valve 4, seated upon the extremity of the induction-pipe, and an inverted safety-cup 5, inclosing the ball-valve and the inwardly-projecting portion of the induction-pipe and adapted to dip at its edge into the contents of the chamber 1 when the latter is so supplied to form a water seal.

The induction-pipe 2 preferably enters the chamber 1 at the center of its bottom and projects upwardly, coincident with the axis of said chamber, to an intermediate point thereof and terminates in a valve-seat, and the valve 4 preferably consists of a yielding or elastic ball, of rubber or like material, of larger diameter than the bore of the induction-pipe and adapted to snugly fit the terminal seat thereof. The inverted safety-cup 5 is arranged over the ball-valve, with its side walls depending around and concentric with the valve-seat and adapted to dip at their edges in the contents of the chamber when the latter is supplied.

In the construction illustrated in Figs. 1 and 2 the eduction-pipe communicates with the chamber 1 at its bottom, as shown at 6, and thence extends upwardly to the plane of the top of the chamber and there is doubled upon itself to form a descending leg. In this construction I also employ a vent-tube 7, which communicates with the interior of the chamber 1 at its top and also communicates with the eduction-pipe at its elbow or loop, or, in other words, at the most elevated point thereof, whereby suction produced in the sewer-pipe will act through vent-tube 7 and raise the cup and ball to take air, as shown in Fig. 2 in dotted lines. Fig. 1 shows the positions of the parts, including the cup and ball, while water is flowing from the induction-pipe through the trap into the eduction-pipe, both eduction-pipe and vent-tube 7 being filled with liquid. After the cessation of the flow of liquid the cup and ball are in the position indicated in full lines in Fig. 2, with the ball by reason of its compressible construction slightly flattened, as indicated, to fit snugly in the terminal seat of the induction-pipe. The water-level in the trap is then approximately in the plane of the top of the chamber 1; but in case of suction in the sewer-pipe or descending leg of the eduction-pipe 3 water will be drawn from the trap casing or chamber 1 until the level thereof descends approximately to the plane indicated by the dotted line *a* in Fig. 2. The suction acting directly through the vent-tube 7 upon the cup and ball will raise the latter to the position indicated in dotted lines in Fig. 2 to allow air to enter the trap-chamber through the induction-pipe, as indicated by the dotted arrows. This influx of air is continued as long as there is suction in the sewer-pipe or the descending leg of the eduction-pipe; but as soon as this suction ceases the cup and ball will return to the positions indicated in full lines in said Fig. 2, with the lower edge of the cup dipping into the remaining water below the plane of the dotted line $a$, and hence constituting a perfect seal. In other words, it will be seen that whereas suction in the sewer-pipe may remove the liquid in the upper portion of the trap-casing 1 above the plane of the valve-seat at the inner end of the induction-pipe it cannot draw the water from the lower portion of said casing for the reason that the vent-tube 7 at this point in the operation breaks the siphon by receiving air from the induction-pipe 2—that is, after the suction has proceeded sufficiently to withdraw the water from the upper portion of the casing 1 the siphon will be broken, air being taken from the induction-pipe by reason of the unseated position of the cup and ball, and after the cessation of suction in the eduction-pipe the cup and ball will return to their normal positions, and there will be sufficient water in the lower portion of the casing to form a complete water seal for the cup. Subsequent suction occurring in the sewer-pipe or the descending leg of the eduction-pipe will produce a like elevation of the cup and ball to supply air through the trap. Thus it will be seen that I have provided a combined trap and vent whereby in case of suction in the sewer-pipe or eduction-pipe air will be supplied through the trap from the induction-pipe before all of the liquid contents of the trap have been removed, the siphon being broken by the use of an auxiliary or vent tube 7, so positioned as to communicate with the trap-casing above the plane of the valve-seat. The specific arrangement of the eduction-pipe, however, does not materially affect the sealing devices of the trap, and I have found in practice that said eduction-pipe may be arranged to communicate with the top of the chamber, as shown in Fig. 3, or the side thereof, as shown in Fig. 4, or at other points which I have deemed it unnecessary to illustrate. In Fig. 3 the eduction-pipe $3^a$ is provided at its upper end with a horizontal extension, forming an elbow with the body portion of the pipe and entering the chamber $1^a$ at $6^a$, the other members of the device being identical with those described in connection with Figs. 1 and 2, and in Fig. 4 I have shown the eduction-pipe $3^b$ in communication with the chamber $1^b$ at the point $6^b$ in the side of said chamber, the other parts of the trap remaining as hereinbefore described.

In connection with Figs. 1 and 2 I described a vent which, however, is in communication with the interior of the chamber at its top to break the siphon or prevent complete siphoning through the eduction-pipe and also serving as a means of relieving the pressure of accumulations of gases in the chamber. In the construction illustrated in Fig. 3 a vent may be dispensed with for the reason that the point of communication of the eduction-pipe with the chamber is at the top of the latter, and hence siphoning cannot occur after the liquid contents are removed to the level of the valve-seat, and the point of communication of the eduction-pipe allows for the escape of gases from the chamber, as in the previously-described form shown in Figs. 1 and 2. In Fig. 4, however, I have shown a vent $7^b$ in communication with the eduction-pipe at its most elevated point, whereby an upcurrent of air is allowed to still further guard against the possibility of gases passing the valve and entering the induction-pipe by drawing said gases into the eduction-pipe. This precaution, however, I have found to be unnecessary in ordinary practice, as the construction of the sealing devices is such that even should the chamber become dry by evaporation the passage of gases from the chamber to the induction-pipe is effectually prevented.

The safety-cup of my improved trap-construction may be of such a weight as to cause the partial flattening of the ball-valve when the parts are seated, to effectually prevent the escape of gases from the chamber into the induction-pipe, particularly when the chamber is dry, or nearly so, as to uncover the lower edge of the wall of said cup; but under ordinary circumstances, when the trap is used at sufficiently frequent intervals to maintain a supply of water in the chamber, the communication with the induction-pipe is effectually sealed by the dipping of the edge of said wall of the cup into the contents of the chamber.

It will be seen from the foregoing description that the sealing devices, including the valve and safety-cup, open inwardly or in the direction of the flow of liquid from the induction-pipe.

It will be understood that in practice various changes in the form, proportion, and the minor details of construction may be resorted to without departing from the spirit or sacrificing any of the advantages of this invention.

Having described my invention, what I claim is—

1. A sealing-trap having a chamber with which communicate induction and eduction pipes, a valve seated upon the discharge end of the induction-pipe to open in the direction of the inward flow through said pipe, and an inverted safety-cup inclosing the valve and having the edge of its wall arranged to dip into the contents of said chamber to form a water seal, substantially as specified.

2. A trap having a chamber and a communicating eduction-pipe, an induction-pipe having a vertical inlet-leg terminating at its upper end in a valve-seat, a valve fitting said seat to open with the flow of liquid from the induction-pipe into the chamber, and an inverted safety-cup inclosing the valve and seat and dipping at the edges of its walls into the contents of the chamber to form a water seal, substantially as specified.

3. A trap having a chamber and a communicating eduction-pipe, an induction-pipe terminating at its inner end in a horizontal valve-seat, an elastic ball-valve fitting said seat, and upwardly displaceable therefrom with the flow of liquid from the induction-pipe, and an inverted safety-cup inclosing said valve, substantially as specified.

4. A trap having a chamber, an induction-pipe communicating with the chamber and terminating in a horizontal valve-seat, and a controlling-valve fitting said seat to open with the flow of liquid from the induction-pipe, and an eduction-pipe having communication with the chamber at a point below the plane of said valve-seat, and provided with a vent communicating with the chamber above the plane of the valve-seat, substantially as specified.

In testimony that I claim the foregoing as my own I have hereto affixed my signature in the presence of two witnesses.

J. D. Q. HAMILTON.

Witnesses:
R. L. HARDIWAN,
A. C. BAKER.